No. 658,743. Patented Sept. 25, 1900.
E. VON TRAUTVETTER.
GEAR WHEEL TRANSMISSION.
(Application filed Dec. 19, 1898. Renewed July 28, 1900.)
(No Model.) 2 Sheets—Sheet 1.
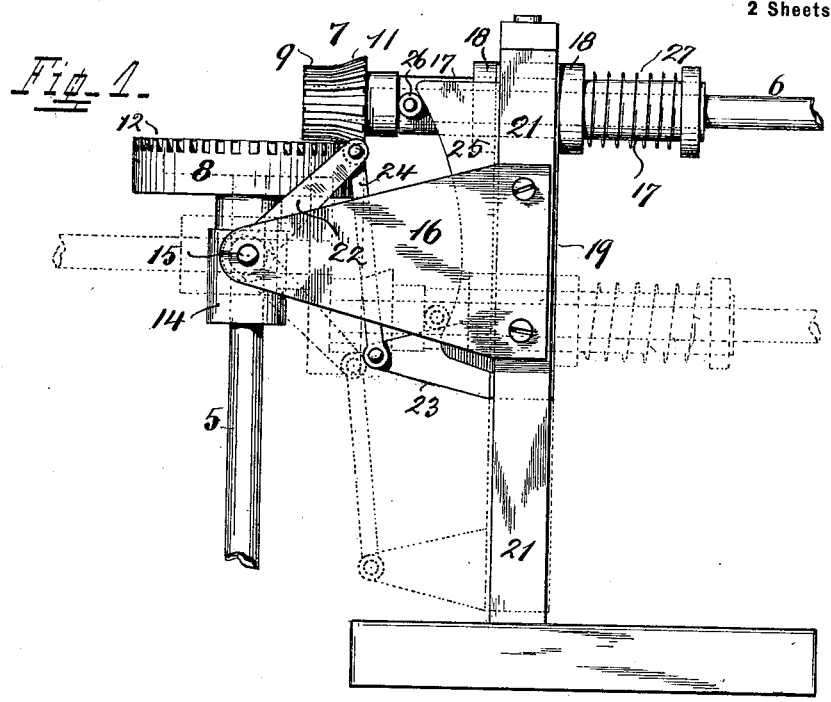
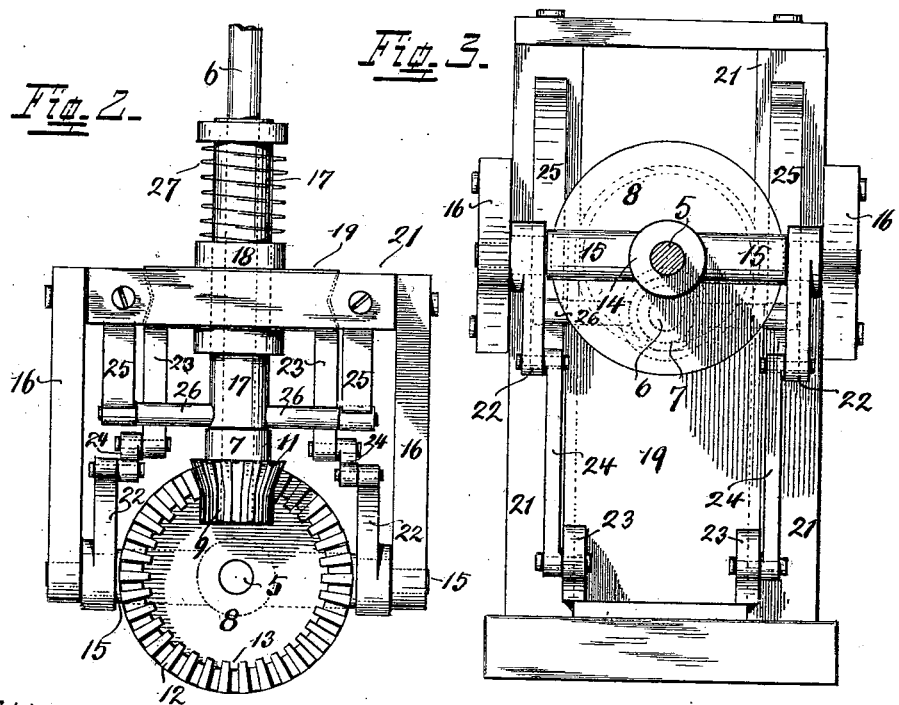
Attest
Edward F. Smith
U. M. White
Inventor
Erwin von Trautvetter
by C. Spengel atty.

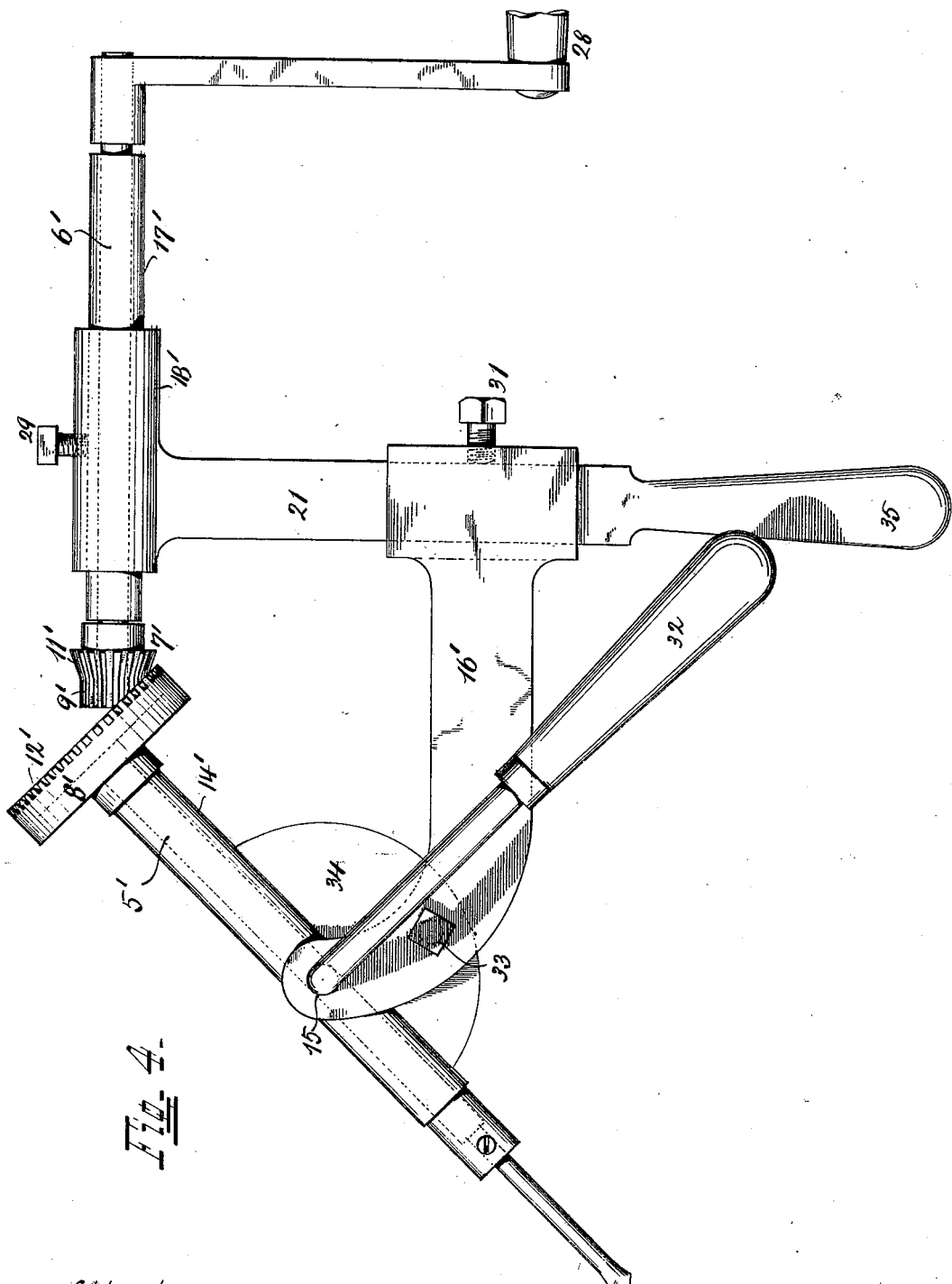

UNITED STATES PATENT OFFICE.

ERWIN VON TRAUTVETTER, OF CINCINNATI, OHIO, ASSIGNOR OF THREE-FOURTHS TO CHARLES E. BABBITT, WINTHROP S. STERLING, AND CHRISTIAN R. HOLMES, OF SAME PLACE.

GEAR-WHEEL TRANSMISSION.

SPECIFICATION forming part of Letters Patent No. 658,743, dated September 25, 1900.

Application filed December 19, 1898. Renewed July 28, 1900. Serial No. 25,142. (No model.)

*To all whom it may concern:*

Be it known that I, ERWIN VON TRAUTVETTER, residing at Cincinnati, Hamilton county, State of Ohio, have invented certain new and useful Improvements in Gear-Wheel Transmissions Under Adjustable Angles; and I do hereby declare the following to be a clear, full, and exact description of the invention, such as will enable others skilled in the art to which it appertains to make and use the same, attention being called to the accompanying two sheets of drawings, with the reference-numerals marked thereon, which form a part of this specification.

This invention relates to means and constructions whereby two shafts arranged in one plane and capable of angular adjustment to each other in such plane may transmit one to the other rotary motion during such adjustment and continue to do so in any adjusted angle within the extremes of at least ninety degrees. The operative connection between the shafts for the purpose of such transmission is by gear-wheels; and the invention consists of the described construction, shape, and arrangement of the gear-wheels themselves and of the means whereby their engagement (mesh) is maintained at any angle to which the shafts may be adjusted within the extremes named. A construction of this kind is useful, for instance, where one shaft has to actuate mechanism requiring different angular positions with reference to the object operated upon and which shaft during such different positions is to receive motion from another shaft, which furnishes the motion, and may be hand or power driven.

In the following specification, and particularly pointed out in the claims, is found a full description of my invention, its parts, construction, and operation, the whole being also illustrated in the accompanying two sheets of drawings, in which—

Figure 1 shows the device in side view with the shafts adjusted to one of their extreme positions, the other extreme position being shown in dotted lines. Fig. 2 is a top view of Fig. 1. Fig. 3 is a front view of the device, with parts in position as they appear in dotted lines in Fig. 1. Fig. 4 shows the principles of my invention practically applied in form of a tool, which may be used for drilling and similar purposes. It shows capacity of operating at an angle and under conditions where access with another tool could, perhaps, not be had.

5 indicates one shaft, which may be the one used in a manner and doing work requiring operation in changeable angular positions. 6 indicates the other shaft transmitting the motion to the shaft first mentioned and constitutes the drive-shaft. The source of power is not essential for present purposes. The operative connection between the shafts is by pinion 7 and gear-wheel 8, one mounted at the end of each shaft. Pinion 7 is a compound spur-and-bevel wheel, the straight teeth on the spur part 9 changing into the beveled teeth on the bevel part 11 on a gradual curve. Gear-wheel 8 is a combined crown and internal gear-wheel, the same teeth on the crown 12 being continued inwardly and form the internal teeth 13, the turn being made on a short curve. One of the shafts, as has been stated, having an angular adjustment it becomes necessary that the other shaft follow it in order to maintain the engagement of the gear-wheels and keep their teeth in mesh. This requires, outside of the swinging motion of the shaft having the angular adjustment and due thereto, also two sliding motions. One of these is in the same plane of the angular motion of the swinging shaft and may be performed by either shaft or by the two jointly, and the other, being a motion in an axial or longitudinal direction, may be performed in the same manner, only by the other shaft. In this case shaft 5 is the one having the angular adjustment and the swinging motion required to accomplish it, while shaft 6 has the other two adjustments, being substantially two motions at right angles to each other, and whereby it becomes possible for pinion 7 to follow the gear-wheel 8, which, while swinging, changes its position at the same time horizontally as well as vertically. For such purposes shaft 5 is mounted in a box 14, pivotally supported by trunnions 15 at the outer end of brackets 16. Shaft 6 is mounted in a box 17 in form of a sleeve which has a sliding adjustment in a longitudinal direction within a bearing 18. This latter is formed in a block 19, which has a sliding adjustment at right angles to the adjustment of sleeve 17, for which purpose it is guided on ways 19 of standards 21, forming parts of a suitable frame. The means whereby the angular adjustment of shaft 5 is determined may operate automatically or they may be set by hand to any particular angle, as illustrated in Fig. 4 and to be presently explained. If operating automatically, the construction of these means depends on conditions particular and other machine elements in connection with which my invention is used. If used with a machine in which a feed-motion is present, the angular adjustment may proceed from it by means of suitable intermediate mechanism connecting to either one of the shafts or their bearings. In such case it is essential that the two shafts be connected in a manner that one follows the other to enable the gear-wheels to remain uninterruptedly in mesh. For such purpose I provide lever-arms 22 rigidly connected to trunnions 15 and brackets 23, projecting from sliding block 19, which two are connected by links 24. It is now clear that the two shafts by their supports are connected in such manner that if shaft 5 is swung or angularly adjusted on the trunnions of its bearing sliding block 19, carrying-shaft 6, will, by means of the connections described, raise or lower shaft 6 on frame 21. Vice versa, if shaft 6 is raised or lowered on frame 21 shaft 5 will be caused to swing correspondingly by reason of the intermediate connections, as will be readily understood. The motions of the shafts so far described would not of themselves be sufficient, however, to maintain the gear-wheels at their ends in engagement, and there is still another adjustment required, the motion of which proceeds longitudinally or in the direction of the axis of the shafts. The two shafts might participate in this adjustment, but under the conditions, as illustrated, shaft 6 must be adjustable, and therefore the latter is only so shown. For such purpose the box-sleeve 17, supporting shaft 6, is given the sliding adjustment in its bearing 18, as already mentioned. The degree of this adjustment is determined and controlled by the curved guides 25, against which projections 26 on sleeve 17 bear, and which, in conjunction with the spring 27, acting against a collar 20 on sleeve 17, hold the latter in the required adjusted position. To reduce friction, rollers may be provided at the ends of projections 26.

In Fig. 4 I have shown the principles of my invention practically applied in form of a tool which may be used for drilling or for operating a screw-driver in positions and locations where access is otherwise difficult. The construction is substantially the same with the exception that the shafts are not connected in a manner to cause one to follow the other automatically, such adjustment being performed by hand, after which the adjusted parts may be held in position by suitable locking devices. The drive-shaft 6' is operated by a crank-handle 28 and rotates in sleeve 17', with which latter it is longitudinally adjustable in bearing 18' to permit pinion 7' to meet cog-wheel 8'. After adjustment it may be held in position by a set-screw 29. Shaft 5' has the same previously-described angular adjustment, being supported with its bearing on trunnions between brackets 16', the latter adjustable on frame 21', to which they may be locked by a set-screw 31. One of the trunnions is extended outwardly and forms a handle 32, whereby shaft 5' may be swung, and which adjustment may proceed during rotation of the shafts and without interrupting operations, provided no set-screws are tightened and the shafts are left free to permit one to follow the other. Shaft 5' may also be locked in position by means of a set-screw 33 impinging on a segmental plate 34, moving between brackets 16'. While this tool is operated by one hand, it is held with the other by taking hold of either one of the handles 32 or 35.

Having described my invention, I claim as new—

1. The combination of a shaft 5, a bearing for it, trunnions whereby these two are pivotally supported, a shaft 6, a sleeve in which it is supported, a bearing for this sleeve in which this latter with shaft 6, is supported in a manner to furnish a sliding adjustment for the two in a direction longitudinal with shaft 6, gear-wheels at the ends of the two shafts capable of transmitting motion from one to the other, a general frame structure to which the means supporting the shafts are connected for the purpose of establishing engagement of the gear-wheels at their ends, the attachment of the means supporting one of the shafts having also an additional sliding adjustment for the purpose of maintaining engagement of the gear-wheels in the adjusted positions of the shafts.

2. A pair of gear-wheels 7 and 8 intended and designed to transmit motion at an adjustable angle, wheel 7 having spur-teeth 9 and bevel-teeth 11 and wheel 8 having crown-teeth 12 and internal teeth 13, the spur-teeth being capable of engaging the internal teeth and the bevel-teeth being capable of engaging the crown-teeth, all as shown and described.

3. In a construction for transmitting motion from one shaft to another by means of gear-wheels where such shafts are supported at an angle to each other which angle is adjustable, the object being to maintain said gear-wheels in engagement during and after adjustment, the combination of a shaft 5, a bearing 14 for it, which latter is pivotally supported, a shaft 6, a sleeve 17 forming a bearing for it, a bearing for sleeve 17 within which the latter is capable of longitudinal movement, a support for this sleeve being free to move with this latter in a direction at right angles to shaft 6, gear-wheels at the adjacent ends of the shafts and means connecting these latter in a manner that pivotal adjustment of shaft 5, or adjustment of shaft 6, causes their adjacent ends to follow each other automatically for the purpose of keeping the gear-wheels thereat in mesh.

4. In a construction for transmitting motion from one shaft to another by means of gear-wheels where such shafts are supported at an angle to each other which angle is adjustable, the object being to maintain said gear-wheels in engagement during adjustment, the combination of a shaft 5, a bearing 14 for it, which latter is pivotally supported, a shaft 6, a sleeve 17 forming a bearing for it, a bearing for sleeve 17, within which the latter is capable of longitudinal movement, a support for this sleeve, being free to move with this latter in a direction at right angles to the shaft supported thereby, gear-wheels at the ends of the adjacent shafts, links connecting their supports in a manner that adjustment of one of these supports causes the other support to adjust itself correspondingly, carrying thereby its shaft with it, engagement of the gear-wheels during such adjustment being maintained by the independent longitudinal adjustment of shaft 6, which is capable of moving in the direction of its axis and curved guides controlling this movement.

5. In a construction for transmitting motion from one shaft to another by means of gear-wheels where such shafts are supported at an angle to each other, which angle is adjustable, the object being to establish engagement of said gear-wheels after adjustment, the combination of two shafts with gear-wheels at their adjacent ends, bearings for these shafts, supports for these bearings, the manner of attachment being as to one bearing to permit pivotal adjustment for it on its support and leaving the other free to move longitudinally within its support, an extension on each of these supports of the shaft-bearings, such two extensions being adjustably connected to each other and means to hold all adjustable parts in their adjusted positions.

In testimony whereof I hereunto set my hand in presence of two witnesses.

ERWIN VON TRAUTVETTER.

Witnesses:
C. SPENGEL,
JOHN C. ROGERS.